United States Patent [19]
Oliver

[11] Patent Number: 5,680,903
[45] Date of Patent: Oct. 28, 1997

[54] LAWN AERATOR HAVING TINE ASSEMBLIES SPACED ALONG A SHAFT

[75] Inventor: William H. Oliver, Englewood, Colo.

[73] Assignee: BlueBird International, Inc., Englewood, Colo.

[21] Appl. No.: 798,573

[22] Filed: Feb. 11, 1997

[51] Int. Cl.$^6$ ........................................... A01B 45/02
[52] U.S. Cl. .................. 172/22; 172/42; 172/123; 172/256; 172/611
[58] Field of Search ............... 172/22, 21, 118, 172/42, 123, 256, 611

[56] References Cited

U.S. PATENT DOCUMENTS

| | | | |
|---|---|---|---|
| 1,807,182 | 5/1931 | Stoner | 172/21 |
| 2,229,497 | 1/1941 | Dontje . | |
| 2,244,099 | 6/1941 | Chase . | |
| 3,171,498 | 3/1965 | Logan | 172/22 |
| 5,029,652 | 7/1991 | Whitfield | 172/21 |
| 5,036,655 | 8/1991 | Holloway | 172/21 X |
| 5,119,880 | 6/1992 | Zehrung, Jr. et al. | 172/22 |
| 5,142,852 | 9/1992 | Nelson | 172/21 X |
| 5,209,306 | 5/1993 | Whitfield | 172/21 |
| 5,460,229 | 10/1995 | Mattis | 172/21 |
| 5,586,604 | 12/1996 | Postema | 172/21 |

FOREIGN PATENT DOCUMENTS

| | | |
|---|---|---|
| 256472 | 5/1963 | Australia . |
| 1558467 | 1/1980 | United Kingdom . |

*Primary Examiner*—Randolph A. Reese
*Assistant Examiner*—Christopher J. Novosad
*Attorney, Agent, or Firm*—Dorr, Carson, Sloan & Birney, P.C.

[57] ABSTRACT

A lawn aerator has a series of tine assemblies spaced along a driven shaft driven by a motor. Each tine assembly has a plurality of tines for aeration extending in a substantially radial pattern about the driven shaft. The inner tine assemblies along the middle portion of the driven shaft are secured to the driven shaft to drive the aerator along the lawn as the driven shaft rotates. The outer tine assemblies adjacent to the ends of the driven shaft are rotatably mounted to the driven shaft. This permits the outer tine assemblies to rotate independently and thereby makes the aerator more maneuverable and easier to turn. Removable weights can be attached to either side of the aerator housing to help maintain a straight course when traversing a slope.

10 Claims, 8 Drawing Sheets

LAWN AERATOR HAVING TINE ASSEMBLIES SPACED ALONG A SHAFT

BACKGROUND OF THE INVENTION

1. Field of the Invention

The present invention relates generally to the field of lawn aerators. More specifically, the present invention discloses a lawn aerator having outer tine assemblies that can freely rotate relative to the driven shaft to increase maneuverability.

2. Statement of the Problem

Conventional lawn aerators have a series of tine assemblies that are rigidly attached at intervals along a drive shaft. Each tine assembly consists of a plurality of hollow tubes or tines that extend radially outward from the shaft and puncture the sod as the aerator is driven along. In a conventional lawn aerator, each of the tine assemblies must rotate at the same angular velocity because each is rigidly attached to the drive shaft. This configuration maximizes traction to pull the aerator along the sod and it does not present a problem as long as the aerator moves in a straight line. However, this configuration does limit maneuverability. In sharp turns, the tine assemblies on the outside of the turn must cover a longer distance and therefore tend to rotate with a greater angular velocity than the tine assemblies on the inside of the turn. In the case of an extremely sharp turn, the tine assemblies on the inside and outside of the curve may tend to rotate in opposite directions. A conventional lawn aerator cannot accommodate such differences in angular velocity, and therefore causes the tines to tear the sod when the aerator is turned. This also subjects the tine assemblies to unnecessary stress and wear, thereby shortening the life of the aerator. The operator can temporarily raise the drive shaft and tine assemblies while turning, but this requires additional thought and effort on the part of the operator and can also slow down operation.

A wide variety of aerators have been widely used in the past, including the following:

| Inventor | Patent No. | Issue Date |
| --- | --- | --- |
| Dontje | 2,229,497 | Jan. 21, 1941 |
| Chase | 2,244,099 | June 3, 1941 |
| Kaye | Australian 256472 | May 23, 1963 |
| Logan | 3,171,498 | March 2, 1965 |
| Merrick | U.K. 1558467 | Jan. 3, 1980 |
| Zehrung et al. | 5,119,880 | June 9, 1992 |
| Mattis | 5,460,229 | Oct. 24, 1995 |

Dontje discloses an aerator with a series of drums 6 that are rotatably mounted on the drive shaft 5. Each of the drums is connected to its adjacent drum by a pawl-and-ratchet mechanism 14, 15 shown in FIG. 3 and discussed at page 2, column 1, lines 4–37 of the specification. When the aerator is turned, the pawl-and-ratchet mechanism will allow the drums on the outside of the turn to rotate faster than the other drums. However, due to the one-way nature of a pawl-and-ratchet mechanism, the aerator would only be able to turn in one direction (i.e., left turns or right turns) but not in both directions. In addition, the Dontje aerator would not facilitate sharp right turns requiring the drums on the inside of the turn to rotate backward, unless the clutch 22 is disengaged. To address these shortcomings, the Dontje patent shows a second embodiment in FIG. 5. This version has two drive chains 44 and two clutches 46 that drive the drums from both ends of the shaft. Differential gear assemblies 51 between each pair of drums allow relative rotation between the drums. The aerator also has wheels (not shown) that are separately driven by a third drive chain 56.

The British patent application by Merrick shows another example of an aerator that allows some degree of relative rotation between the slitter disks 10 in an aerator. As shown in FIG. 2, the square hole 10a in the center of each slitter engages the square boss 13b of the spacer 13 to its left. The spacer to the right of each slitter is driven solely by friction. Only the thrust washer 14 at the left end of the assembly is directly driven by the motor and drive shaft 11. The entire column of spacers and slitters must be held in compression to maintain friction between the slitters and the spacers.

Zehrung et al. discloses an example of a lawn aerator with a series of rotors having aerating tines. Each rotor is rigidly attached to a drive shaft.

Logan and Mattis disclose aerators having drums or disks that can rotate independently because these aerators are designed to be towed behind a tractor. This eliminates the need for any of the drums or disks to drive the aerator along the sod.

Chase discloses a rotary cutter having a plurality of interchangeable cutter blades.

Kaye discloses a soil-aerating machine with a series of rotary spiking members attached at spaced intervals to a transverse drive shaft. Each of the rotary spiking members consists of a star-shaped disc or plate having a series of outwardly projecting points that are adapted to penetrate the turf to a suitable depth as the disc rotates.

3. Solution to the Problem

None of the prior art references uncovered in the search show a lawn aerator having a series of inner tine assemblies that are driven by the motor and driven shaft to provide traction, and a series of outer tine assemblies rotatably mounted adjacent to the ends of the driven shaft to provide increased maneuverability.

SUMMARY OF THE INVENTION

This invention provides a lawn aerator that is more maneuverable and easier to turn. The aerator has a series of tine assemblies spaced along a driven shaft driven by a motor. Each tine assembly has a plurality of tines for aeration extending in a substantially radial pattern about the driven shaft. The inner tine assemblies along the middle portion of the driven shaft are secured to the driven shaft to pull the aerator along the sod as the driven shaft rotates. The outer tine assemblies adjacent to the ends of the driven shaft are rotatably mounted to the driven shaft. This permits the outer tine assemblies to rotate independently of the driven shaft and inner tine assemblies during turns. Removable weights can be attached to either side of the aerator housing to help maintain a straight course when traversing a slope.

BRIEF DESCRIPTION OF THE DRAWINGS

The present invention can be more readily understood in conjunction with the accompanying drawings, in which.

DETAILED DESCRIPTION OF THE INVENTION

Figure 1:
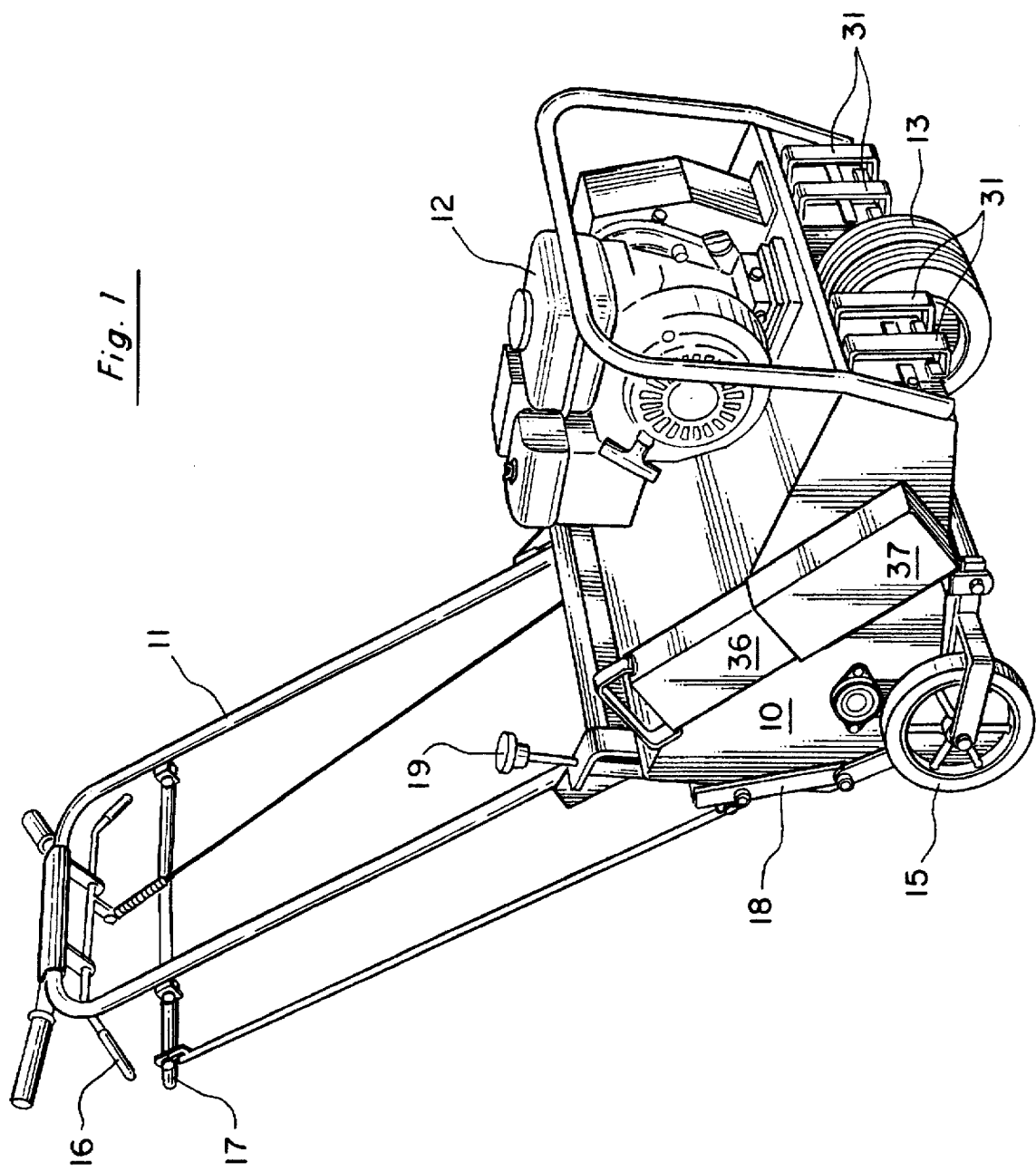
FIG. 1 is a front perspective view of the aerator assembly.
Figure 2:
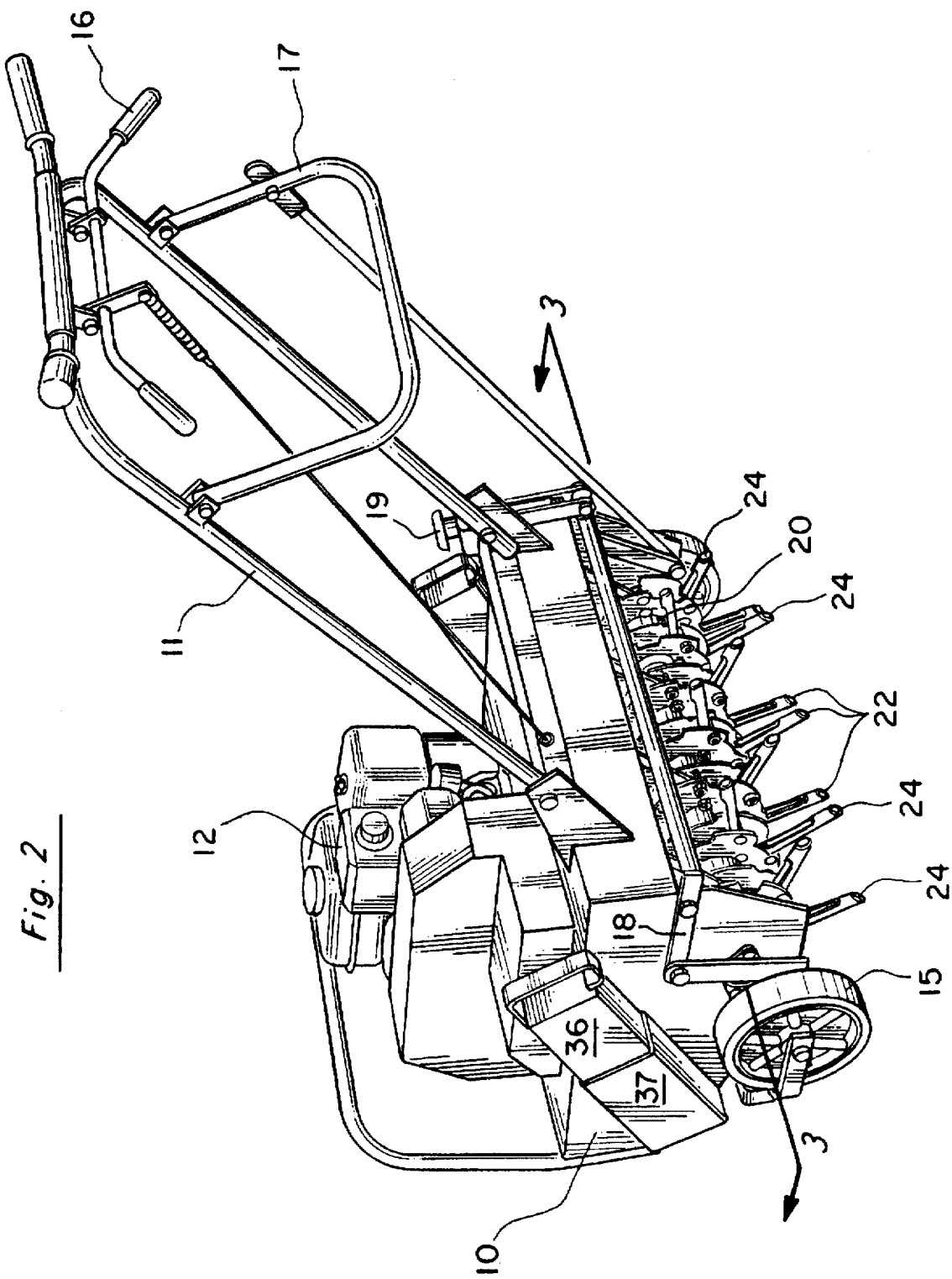
FIG. 2 is a rear perspective view of the aerator assembly.

Turning to FIG. 1, a front perspective view of the entire aerator assembly is provided. A corresponding rear perspective view is shown in FIG. 2. The aerator has a housing or frame 10 carrying a motor 12 (e.g., a four horsepower Honda gasoline-powered engine). The housing 10 is supported above the ground by a series of front and rear wheels 13, 15, as shown in FIG. 1. The motor 12 powers a drive chain 14, which in turn rotates a driven shaft 20 connected to a plurality of tine assemblies 22, 24 as depicted in FIGS. 2 and 3.

Figure 10:
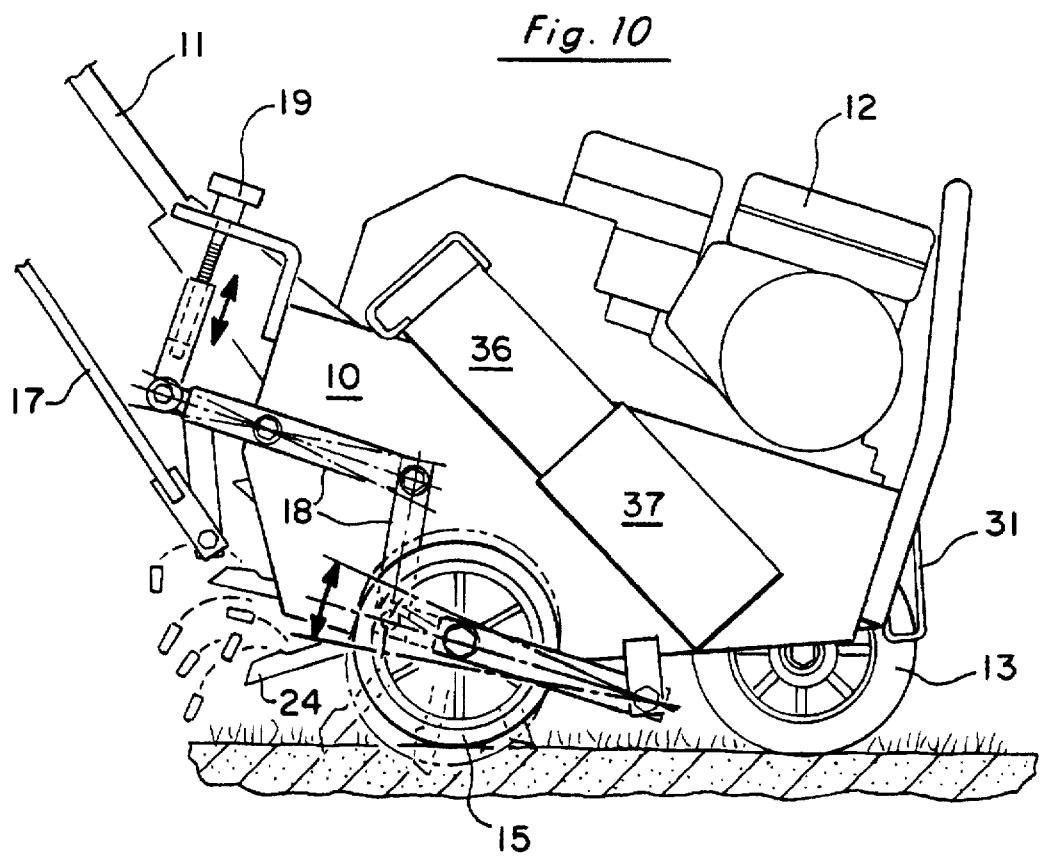
FIG. 10 is a side elevational view of the aerator assembly showing the raised and lowered positions of the rear wheels.

Returning to FIGS. 1 and 2, the aerator assembly also has a handle 11 extending diagonally rearward and upward from the aerator frame 10 that allows the user to control the direction and operation of the aerator. A clutch lever 16 controls a clutch (not shown) between the motor 12 and drive chain 14 that controls whether the driven shaft 20 and inner tine assemblies 22 are driven by the motor 12. The handle 11 also has a wheel control lever 17 connected to a mechanical linkage 18 that moves the elevation of the rear wheels 15 between raised and lowered positions. FIG. 10 is a side elevation view of the aerator assembly showing the raised and lowered positions of the rear wheels 15. In the raised position, the tine assemblies 22, 24 are lifted completely out of contact with the sod. In the lowered position, the tips of the tine assemblies 22, 24 penetrate the sod for aeration. The depth of penetration can be manually adjusted by turning the depth adjustment knob 19 depending on sod conditions. In particular, the depth should be set so that the rear wheels 15 remain in contact with the ground during operation to help stabilize the aerator.

Figure 3:
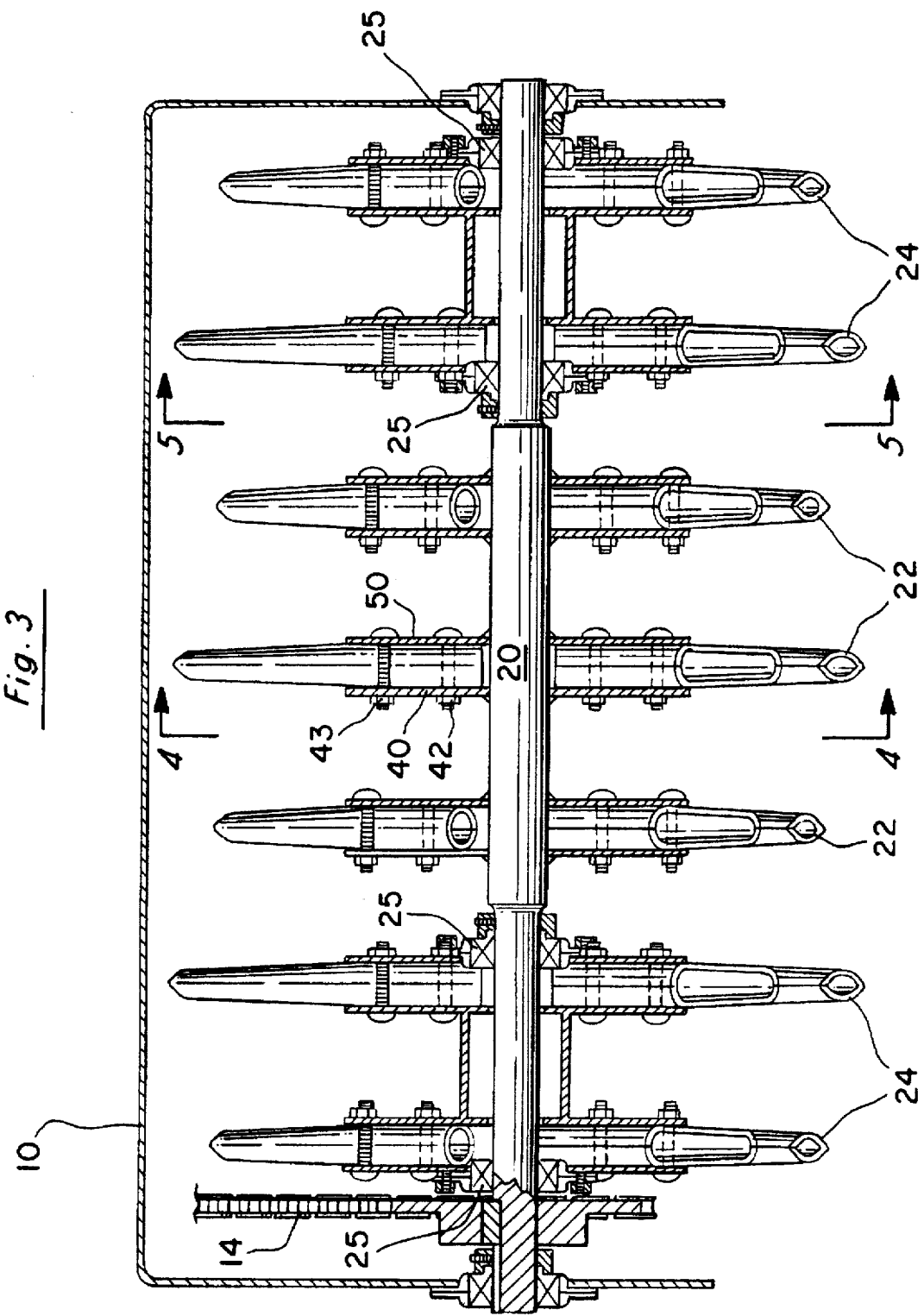
FIG. 3 is a cross-sectional view of the driven shaft and tine assemblies.

FIG. 3 shows a front cross-sectional view of the drive shaft 20 and tine assemblies 22, 24. A series of inner tine assemblies 22 are secured to (e.g., by welding) the medial portion of the driven shaft 20 at predetermined intervals. A series of outer tine assemblies 24 are rotatably mounted at intervals on bearings 25 adjacent to both ends of the driven shaft 20. This allows each outer tine assembly 24 to rotate independently relative to the driven shaft 20 and the other tine assemblies. Each outer tine assembly 24 can be permitted to independently rotate relative to every other outer tine assembly or the outer tine assemblies can be mounted in pairs as shown in FIG. 3. The inner tine assemblies 22 drive the aerator along the lawn, while the outer tine assemblies 24 are rotated by contact with the lawn as the aerator is driven along the lawn. However, both the tips of both inner and outer tine assemblies 22, 24 penetrate the sod to provide aeration.

Figure 6:
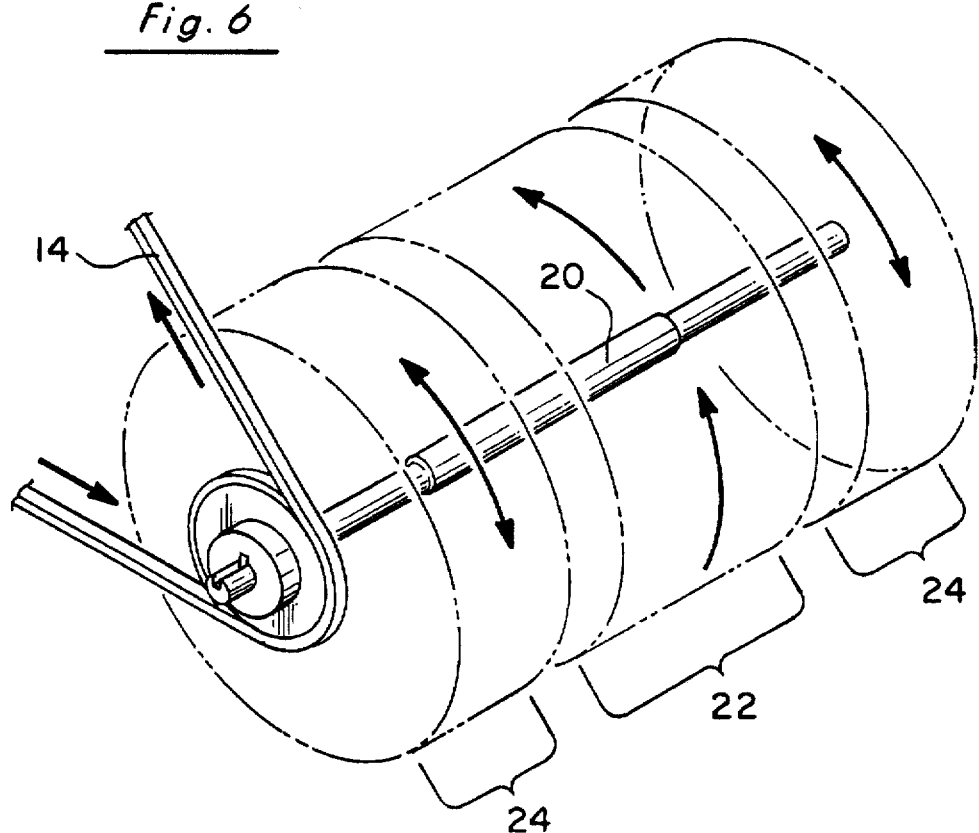
FIG. 6 is a simplified detail rear perspective view of the driven shaft, inner tine assemblies and outer tine assemblies in rotation.
Figure 7:
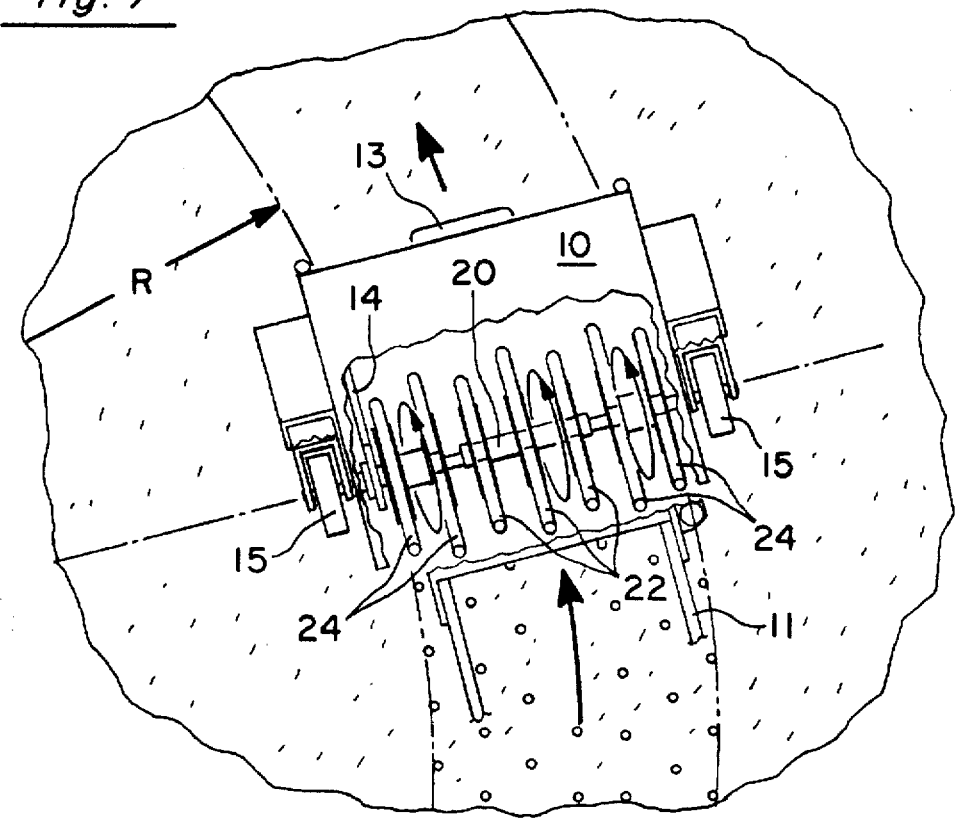
FIG. 7 is a simplified top view of the aerator assembly making a turn with a portion of the housing cut away to reveal the driven shaft and tine assemblies.

The major advantage of this configuration is increased maneuverability of the aerator, particularly in making turns. FIG. 7 is a simplified top view of the aerator assembly making a turn with a radius R. A portion of the housing 10 has been cut away to reveal the driven shaft 20 and tine assemblies 22, 24. FIG. 6 is a simplified detail rear perspective view of the driven shaft 20, inner tine assemblies 22 and outer tine assemblies 24 in rotation. The inner fine assemblies 22 are driven by rotation of the driven shaft 20 and pull the entire aerator assembly forward as the tines of the inner tine assemblies 22 penetrate the sod. As previously discussed, the outer tine assemblies 24 freely rotate relative to the driven shaft 20 and the other tine assemblies. This free-wheeling arrangement permits the outer tine assemblies 24 to rotate with an angular velocity different from that of the inner tine assemblies 22. The outer tine assemblies 24 on the inside of the turn will rotate more slowly than the inner tine assemblies 22. Similarly, the outer tine assemblies 24 on the outside of the turn will rotate more rapidly than the inner tine assemblies 22.

In the preferred embodiment of the present invention shown in the drawings, a series of seven tine assemblies are spaced at intervals along the driven shaft 20. Of these, three are inner tine assemblies 22. Two outer tine assemblies 24 are rotatably mounted adjacent to each end of the driven shaft 20 by bearings 25. Alternatively, five inner tine assemblies 22 can be rigidly attached to the driven shaft 20, while one outer tine assembly 24 is rotatably mounted adjacent to each end of the driven shaft 20.

Figure 4:
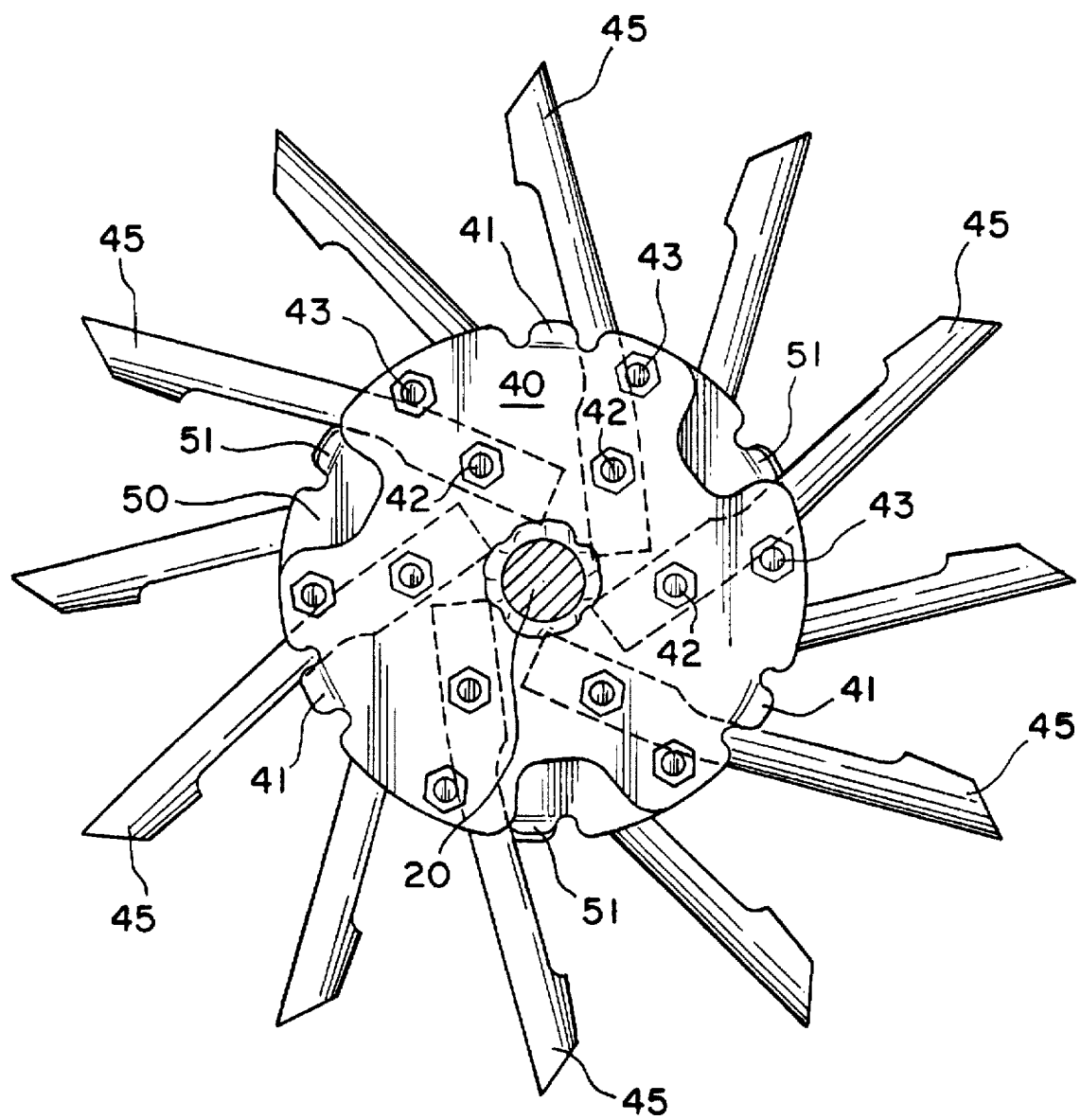
FIG. 4 is a cross-sectional view of the driven shaft and inner tine assemblies perpendicular to the plane of FIG. 3.
Figure 5:
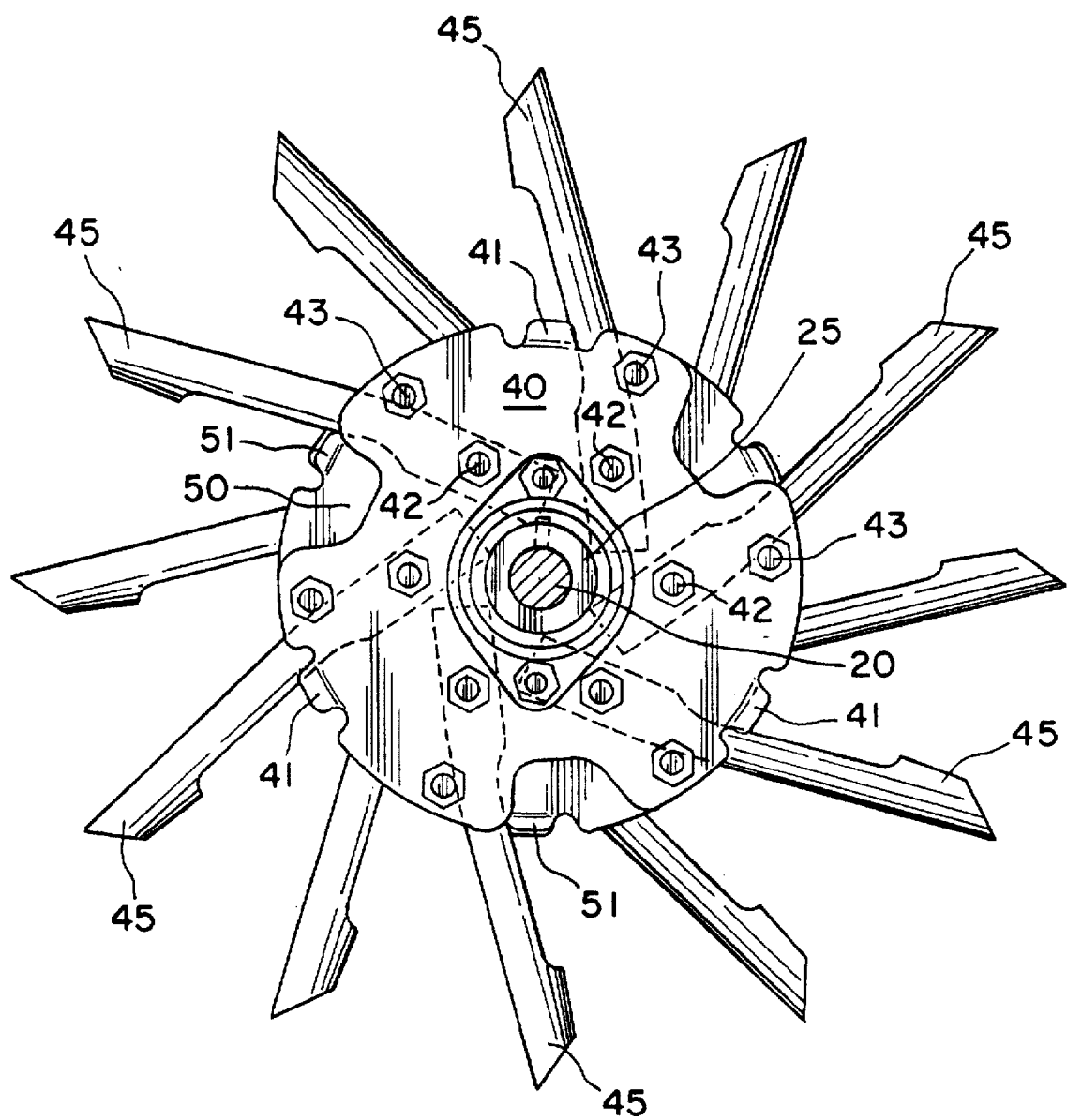
FIG. 5 is a cross-sectional view of the driven shaft and outer tine assemblies perpendicular to the plane of FIG. 3.

FIG. 4 is a cross-sectional view of the driven shaft 20 and inner tine assemblies 22 perpendicular to the plane of FIG. 3. FIG. 5 is a corresponding side cross-sectional view of the outer tine assemblies 24. Each tine assembly 22, 24 consists of two parallel plates 40, 50 as illustrated in FIG. 3. A series of tines 45 are sandwiched between the parallel plates 40, 50 and extend outward in a generally radial pattern about the driven shaft 20. Each tine assembly 22, 24 holds six tines 45 with an angular spacing of about 60° between adjacent tines 45. Each tine 45 is secured by an anchor bolt 42 extending through the plates 40, 50 and the base of the tine 45 as shown in FIGS. 4 and 5. The angular orientation of each tine 45 is fixed by an outer bolt 43 extending through the plates 40, 50 that blocks rearward rotation of the tine 45 relative to the remainder of its tine assembly. Forward rotation of each tine 45 relative to the remainder of the tine assembly is prevented by an alternating series of tabs 41, 51 that are bent medially inward around the periphery of the plates 40, 50.

Figure 8:
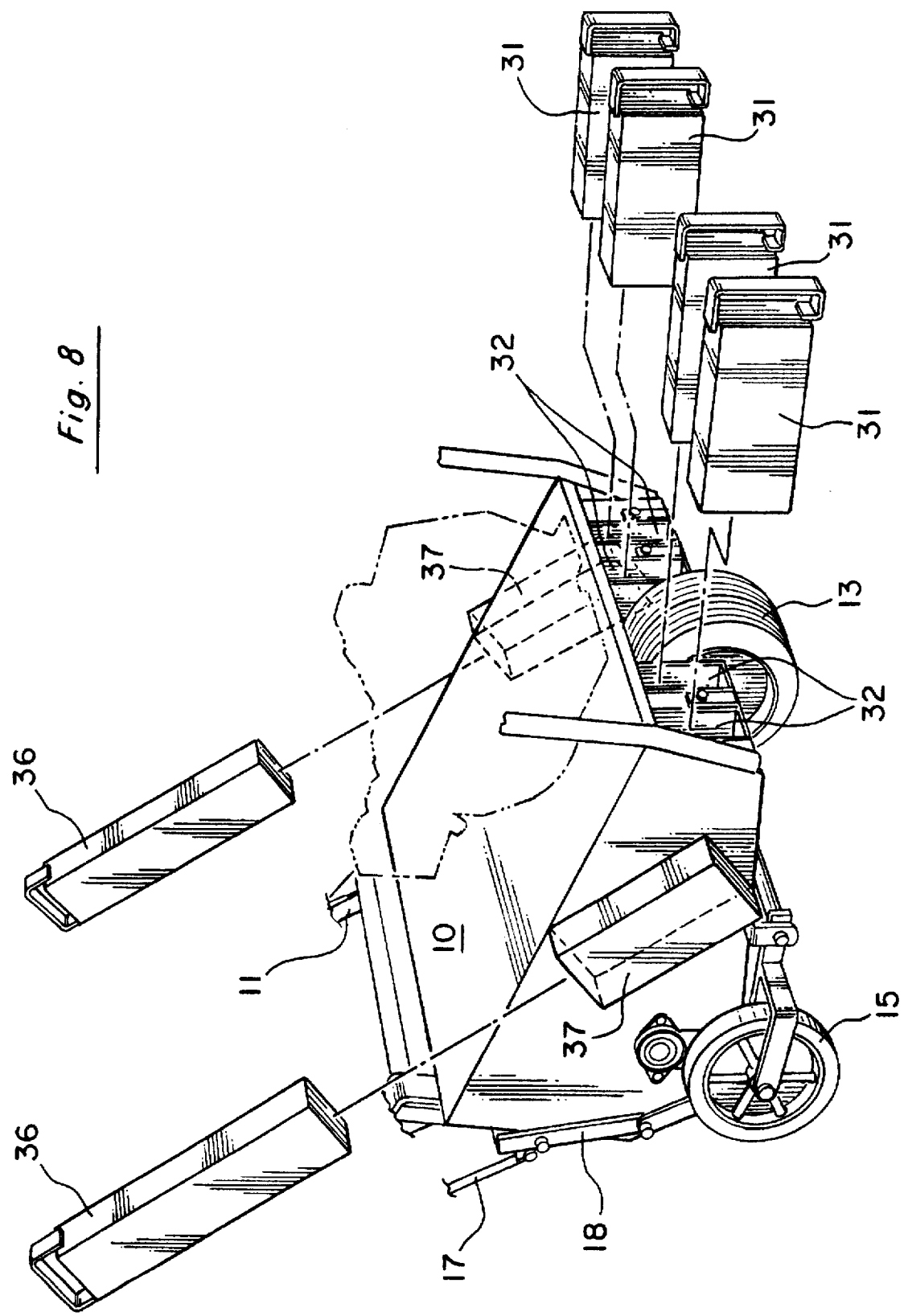
FIG. 8 is front perspective view of a portion of the aerator housing showing the removable front and side weights.
Figure 9:
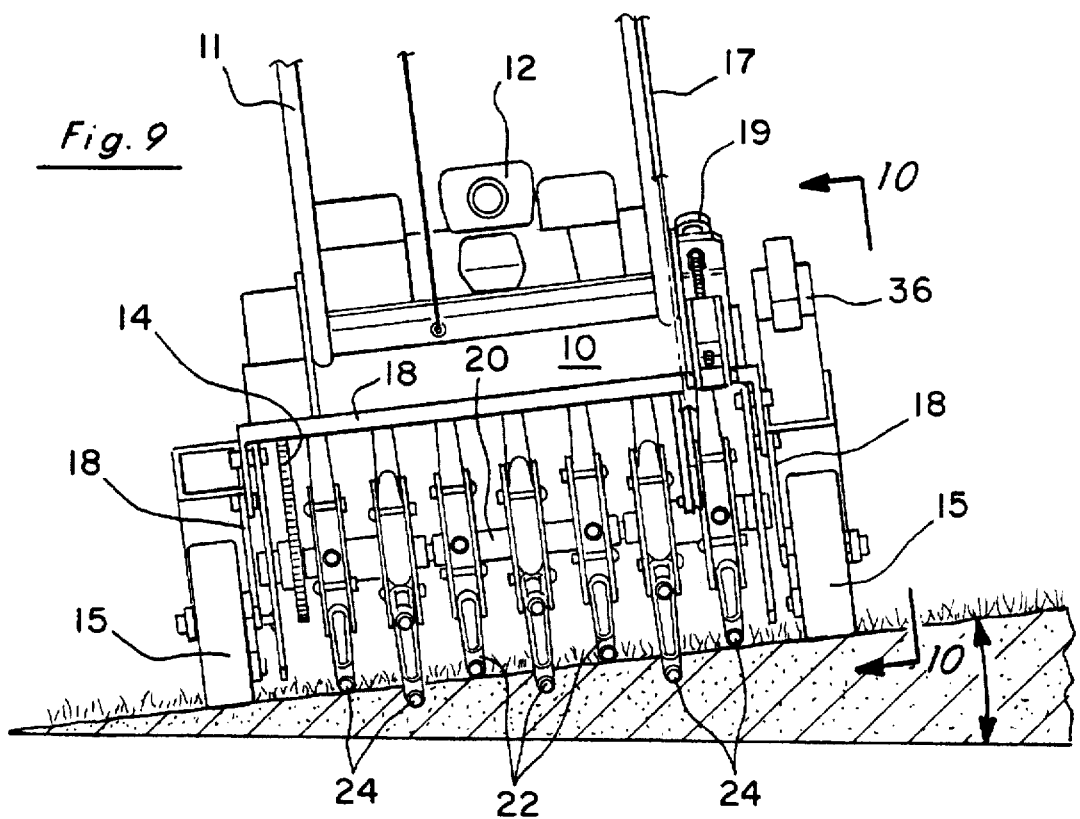
FIG. 9 is a rear elevational view of tine assemblies driven shaft and a portion of the aerator housing with the removable side weight 36 on the uphill side of the aerator.

As shown in FIGS. 1 and 10, removable weights 36 can be attached to either side of the aerator housing 10 to help maintain a straight course when traversing a slope. In one embodiment of the present invention, each side weight weighs about 36 pounds. The side weight 36 is manually inserted into the side slot 37 on the uphill side of the aerator housing 10 as shown in FIGS. 8 and 9. The aerator may also be equipped with removable front weights 31 (e.g., about 18 pounds each) that can be inserted into slots 32 in the front of the aerator housing 10 to increase traction and increase the penetrating force exerted by the tines 45 on the sod. The front slots 32 are slanted slightly to retain the front weights 31. A latch mechanism can also be used to retain the front weights 31 in the front slots 32. FIG. 8 is front perspective view of a portion of the aerator housing 10 and removable front weights 31 and side weights 36.

The above disclosure sets forth a number of embodiments of the present invention. Other arrangements or embodiments, not precisely set forth, could be practiced under the teachings of the present invention and as set forth in the following claims.

I claim:

1. A lawn aerator for aerating a lawn comprising:

a motor;

a driven shaft driven by said motor and having two ends;

a plurality of inner tine assemblies secured to and spaced along said driven shaft to aerate the lawn and drive said lawn aerator along the lawn; and a plurality of outer tine assemblies rotatably mounted to said driven shaft adjacent to said ends of said driven shaft, said outer tine assemblies being rotated by contact with the lawn as said lawn aerator is driven along the lawn to aerate the lawn.

2. The aerator of claim 1 wherein each outer tine assembly rotates independently relative to said driven shaft.

3. The aerator of claim 1 wherein said driven shaft further comprises a medial portion between said ends, and said inner tine assemblies are secured to and spaced along said medial portion of said driven shaft.

4. The aerator of claim 1 wherein said inner and outer tine assemblies have a plurality of tines for aeration extending in a substantially radial pattern about said driven shaft.

5. The aerator of claim 1 further comprising a housing supporting said motor and driven shaft having two sides; and at least one weight that can be removably attached to either of said sides of said housing.

6. A lawn aerator comprising:

a motor;

a driven shaft driven by said motor having a medial portion and two opposing end portions;

a plurality of inner tine assemblies secured to and spaced along said medial portion of said driven shaft, each inner tine assembly having a plurality of tines for aeration extending in a substantially radial pattern about said driven shaft; and a plurality of outer tine assemblies rotatably mounted to said end portions of said driven shaft, each outer tine assembly having a plurality of tines for aeration extending in a substantially radial pattern about said driven shaft.

7. The aerator of claim 6 wherein each outer tine assembly rotates independently relative to said driven shaft.

8. The aerator of claim 6 further comprising a housing supporting said motor and driven shaft having two side portions; and at least one weight that can be removably attached to either of said side portions of said housing.

9. A lawn aerator for aerating a lawn comprising:

a motor;

a driven shaft driven by said motor having a medial portion and two opposing end portions;

a housing supporting said motor and driven shaft having two side portions;

at least one weight that can be removably attached to either of said side portions of said housing;

a plurality of inner tine assemblies secured to and spaced along said medial portion of said driven shaft to aerate the lawn and drive said lawn aerator along the lawn, each inner tine assembly having a plurality of tines extending in a substantially radial pattern about said driven shaft; and a plurality of outer tine assemblies rotatably mounted to said end portions of said driven shaft, each outer tine assembly having a plurality of tines extending in a substantially radial pattern about said driven shaft, said outer tine assemblies being rotated by contact with the lawn as said lawn aerator is driven along the lawn to aerate the lawn.

10. The aerator of claim 9 wherein each outer tine assembly rotates independently relative to said driven shaft.

* * * * *